United States Patent [19]

Frieder, Jr. et al.

[11] 4,087,653
[45] May 2, 1978

[54] SOUND ATTENUATING EARCUP ASSEMBLY PROVIDED WITH RECEIVERS AND CONTACT MICROPHONE

[75] Inventors: Leonard P. Frieder, Jr., Dalton; Jackson A. Aileo, Carbondale, both of Pa.

[73] Assignee: Gentex Corporation, Carbondale, Pa.

[21] Appl. No.: 739,266

[22] Filed: Nov. 5, 1976

Related U.S. Application Data

[62] Division of Ser. No. 641,450, Dec. 17, 1975, Pat. No. 4,023,209.

[51] Int. Cl.² .................. H04M 1/05; H04R 1/10
[52] U.S. Cl. .................. 179/156 R; 179/182 R
[58] Field of Search ................. 179/156 R, 182

[56] References Cited

U.S. PATENT DOCUMENTS

| 1,984,062 | 12/1934 | Foley | 179/29 |
| 2,142,993 | 1/1939 | Brown | 179/167 X |
| 3,087,028 | 4/1963 | Bonnin | 179/156 R |
| 3,869,584 | 3/1975 | Wilde | 179/156 R |

*Primary Examiner*—William C. Cooper
*Attorney, Agent, or Firm*—Shenier & O'Connor

[57] ABSTRACT

A head gear assembly including first and second sound attenuating earcups and means for supporting the earcups over the ears of a wearer and in which each of said earcups has an earphone therein, one of said earcups has a contact microphone therein and switch means is provided for enabling said contact microphone while disabling the earphone in the cup in which the contact microphone is located.

12 Claims, 6 Drawing Figures

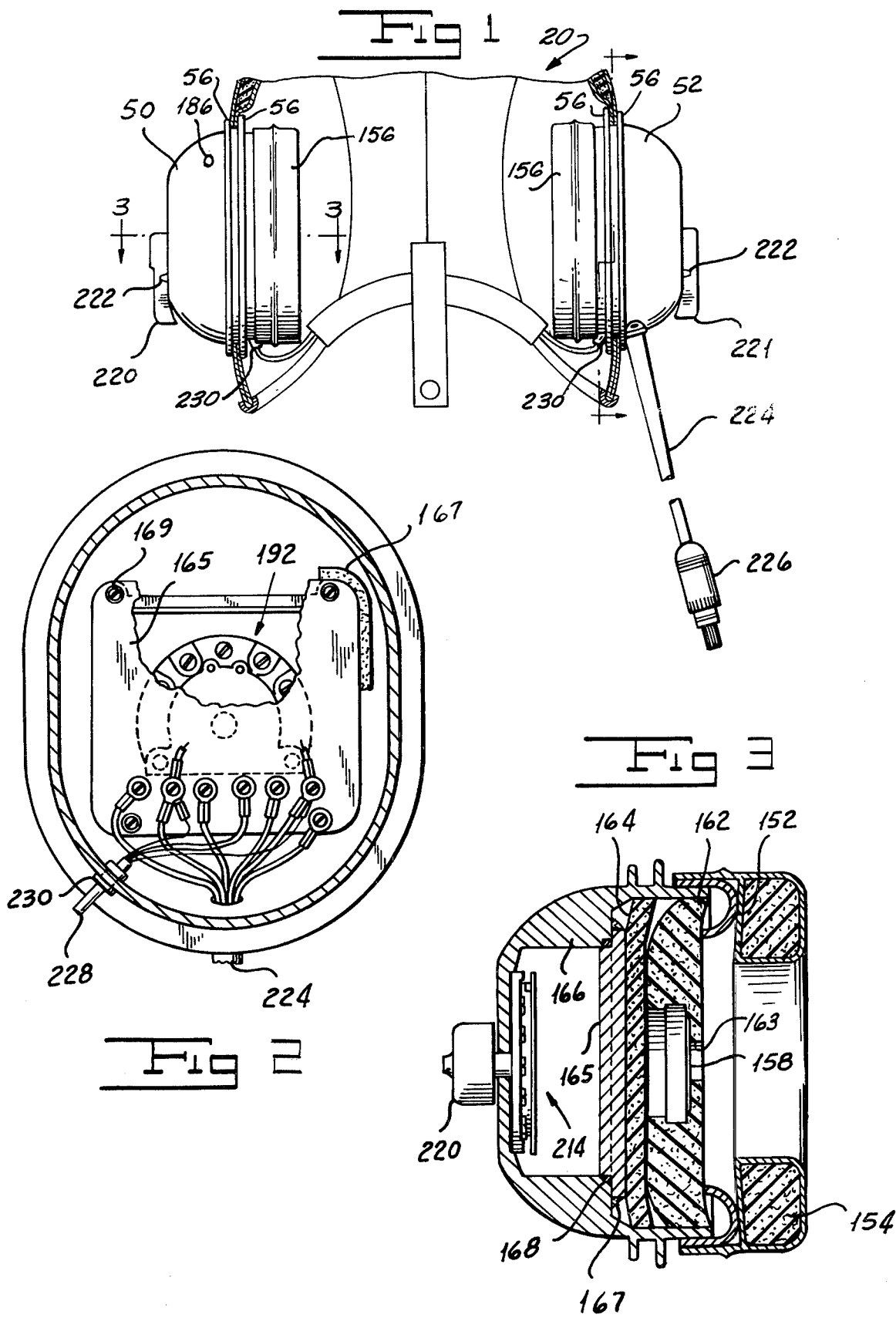

… …

SOUND ATTENUATING EARCUP ASSEMBLY PROVIDED WITH RECEIVERS AND CONTACT MICROPHONE

This is a division of application Ser. No. 641,450, filed Dec. 17, 1975, now U.S. Pat. 4,023,209.

BACKGROUND OF THE INVENTION

A problem in the prior art of protective helmets and of sound attenuating earcup assembly used therewith involves the design of an unobtrusive, yet effective microphone for two-way voice communication. Prior art arrangements using a boom or similar assembly to place the microphone in front of the mouth lead to the problems referred to earlier when the wearer is working in close facial proximity to equipment. Previous attempts to place the microphone within the earcup have resulted in feedback between the microphone and the adjacent earphone.

SUMMARY OF THE INVENTION

One object of the present invention is to provide a protective helmet assembly having a microphone permitting adequate access to the face of the wearer while being free from objectionable acoustic feedback.

Another object of our invention is to provide a sound attenuating earcup assembly provided with a microphone and earphone system disposed within the earcups while at the same time avoiding acoustic feedback.

Other and further objects will be apparent from the following description.

Our invention contemplates a sound attenuating earcup assembly in which each earcup makes an acoustic seal with the wearer's head around his ear, each earcup houses an earphone and in which a contact microphone placed within the acoustic seal of one of the earcups housing the earphones. The contact microphone is urged against the temple area of the wearer, preferably, by a spring or other resilient means housed in a shock-mounted receptacle and means are provided for disabling the earphone in the earcup housing the microphone whenever the microphone is activated. This arrangement is highly effective in shielding the contact microphone from surrounding noise and in making the microphone physically unobtrusive. At the same time, since the adjacent earphone is disabled whenever the microphone is actuated, there is no problem of undesirable acoustic feedback.

BRIEF DESCRIPTION OF THE DRAWINGS

In the drawings, which are incorporated into the instant specification and are to be read in conjunction therewith, and in which like reference numerals are used to indicate like parts:

FIG. 1 is a front elevation, shown partly in section, of our earcup assembly incorporated in a protective helmet assembly.

FIG. 2 is an enlarged section of one earcup, taken along the line 2—2 of FIG. 1.

FIG. 3 is an enlarged section of the other earcup, taken along the line 3—3 of FIG. 1.

DETAILED DESCRIPTION OF THE INVENTION

Figure 4:
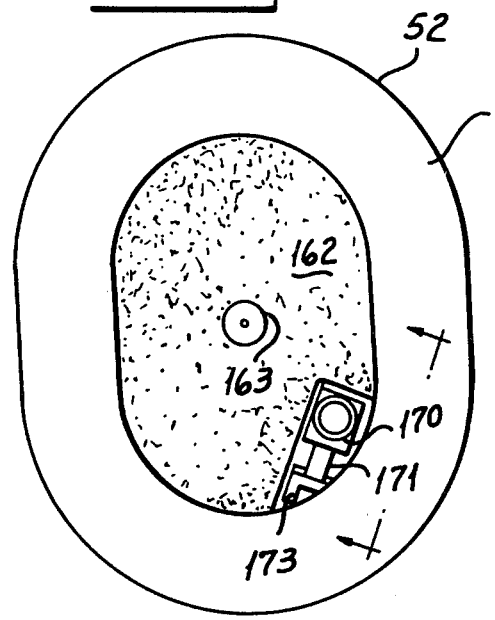
FIG. 4 is a side elevation of the earcup shown in FIG. 2 illustrating the placement of the contact microphone.
Figure 5:
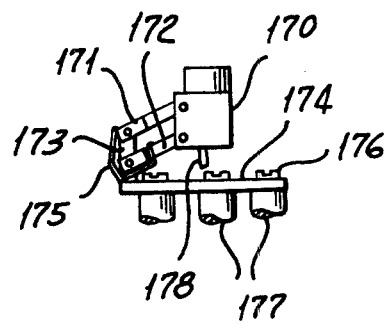
FIG. 5 is a section of the contact microphone mounting assembly, taken along the line 5—5 of FIG. 4.

Referring now to FIGS. 1 to 6 our sound attenuating earcup assembly includes earcups 50 and 52 which may be incorporated in a protective helmet assembly 20 adapted to fit relatively closely over the wearer's head. Helmet assembly 20 is described more fully in the application Ser. No. 641,450 previously referred to, now U.S. Pat. No. 4,023,209. Each of the earcups 50 and 52 includes spaced flanges 56 to facilitate mounting in the assembly 20. Earcups 50 and 52 are provided with inner peripheral flanges 152 for accepting generally elliptical annular pads 154 and 156 made up of envelopes filled with foamed rubber and assembled on the cups over the flanges 152. Pads 154 and 156 are shaped to envelop the ear in acoustic isolation from the surrounding environment. Right and left earcups 50 and 52 house right and left earphones 158 and 160, respectively. Each of the earphones 158 and 160 is encased in an isolating pad 162 of foamed rubber or the like having a central aperture 163 on its inner face to provide acoustical communication to the ear. A foam pad 164 spaces pad 162 from a cover plate 165 which is assembled in an inner wall flange 166 surrounding an inner recess in the cup by screws 169, or the like. A gasket 168 and a layer 167 of suitable waterproofing material seal the recess.

We mount a spring-loaded microphone 170 in the left earcup 52 at a location at which it contacts a region of the wear's head at which it picks up vibrations produced as the wearer speaks. The microphone 170 is preferable pivotally attached to the ends of a pair of arms 171 and 172, the other ends of which are pivotally attached to an upstanding support 173 carried by a base 174. A spring 175 placed between arm 172 and the support 173 biases the arms upwardly to urge the microphone into contact with the head of the wearer. The base 174 is rigidly secured to the earcup through suitable screws 176 and spacers 177. A cable 178 containing output leads 180 and 182 extends from the bottom of the microphone 170.

The right earcup 50 carries a sound intensifier microphone 186 to allow the helmet wearer to listen to outside sounds without removing the helmet. The sound intensifier microphone 186 is preferably rigidly mounted in a suitable aperture formed in the earcup 50 so as to face outwardly to monitor ambient sounds.

Contact microphone leads 180 and 182 are coupled to an amplifier 188, supplied with power from a 6 volt line 190 and the output lead of which is connected to the movable contact of one switch 194 of a triple-pole, double-throw rotary switch assembly indicated generally by the reference character 192. Switch assembly 192 is normally biased into the center position shown in FIG. 6, but may be moved upwardly into a locking "intercom" position or downwardly into a momentary "radio" position. The intercom or upper contact of switch 194 is coupled to a "microphone intercom" line 196, while the radio or lower contact of switch 194 is coupled to a "microphone radio" line 198. The right earphone 158 is directly connected between an "earphone" line 200 and an "earphone ground" line 202. The left earphone 160 is coupled to lines 200 and 202 through a switch 210 which is closed only when the switch assembly 192 is in a center position. The earphone ground line 202 is also coupled to the movable contact of a third switch 204 of the switch assembly 192, the fixed contacts of which are coupled respectively to an "intercom" line 206 and a "radio" line 208.

The sound intensifier microphone 186 feeds an amplifier 202 which is controlled by one switch 216 of a double-pole, double-throw rotary switch assembly indicated generally by the reference character 214. Amplifier 212 receives power from the 6 volt line 190 and has its output leads coupled to the earphone ground line 202 directly and to the earphone line 200 through a second switch 218 of the switch assembly 214.

We mount switch assemblies 192 and 214, respectively, on the inner surfaces of the outer walls of left and right earcups 52 and 50. The switch assemblies include respective control levers 220 and 221 carried by the switch shafts. Preferably, the outer walls of the earcups 50 and 52 are provided with stops 222 to limit movement of levers 220 and 221 to prevent possible damage to the switches 192 and 214. The switches 192 and 214 are protected from moisture by the cover plates 165 enclosing the switches from the inner sides of the respective earcups.

Lines 190, 196, 198, 200, 202, 206, and 208 are made accessible to external equipment through a cable 224 running from the left earcup 52 and terminated by a plug 226. The right earphone 158, the sound intensifier microphone 186, the amplifier 212, and the switch assembly 214 are coupled to the other components in the left earcup 52 through a thin cable 228 which enters the respective earcups through grommets 230 located inwardly of earcup retaining flanges 56.

Figure 6:
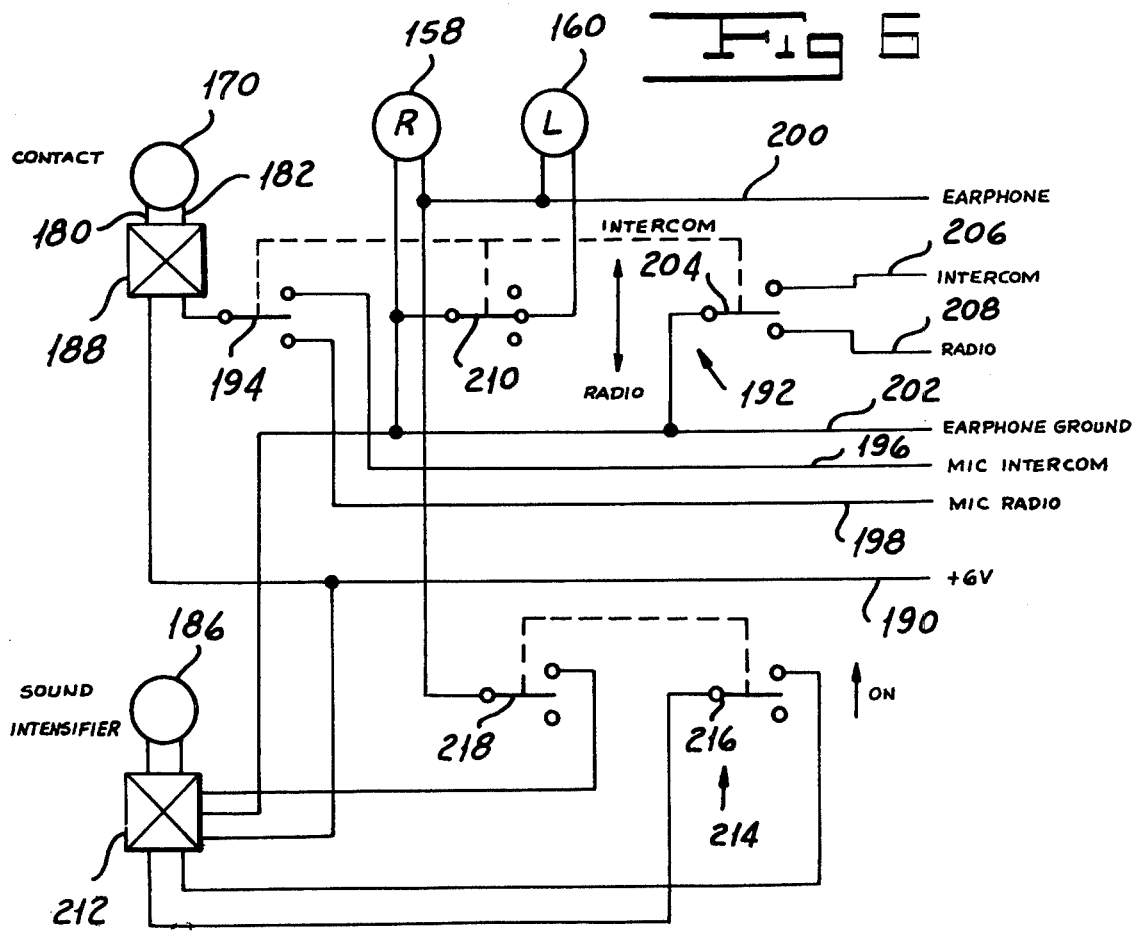
FIG. 6 is a schematic view of the circuit controlling the contact microphone and the earphones.

The circuit shown in FIG. 6 allows the wearer to communicate readily over two different transmission systems. The "radio" system may, for example, be used for long distance communication, while the "intercom" system may be used for persons located in the same vehicle such as a tank. With switch assembly 192 in a center position, the contact microphone 170 is deactivated, while earphones 158 and 160 are connected in parallel between lines 200 and 202 to receive a suitable audio signal. When switch assembly 192 is moved to the intercom position, which is the upper position in FIG. 6, the contact microphone 170 is connected between the 6 volt line 190 and microphone intercom line 196 to provide a suitable signal over the intercom line. At the same time, the left earphone 160 is disconnected from the earphone ground line 202 to prevent undesirable acoustic feedback. In a similar manner, when switch assembly 192 is moved to the radio position, which is the lower position in FIG. 6, the contact microphone 170 is connected between the 6 volt line 190 and the microphone radio line 198 while the left earphone 160 is again disconnected from line 202 to prevent feedback.

With switch assembly 214 in an off position, the sound intensifier microphone 186 is deactivated and the helmet wearer is shielded from the ambient noise by pads 154 and 156. When switch assembly 214 is moved into an on position, the output of the amplifier 212 connected to the sound intensifier microphone 186 is applied across lines 200 and 202 to permit the wearer to monitor outside sounds when desired.

The operation of the earphone and microphone system associated with our helmet will be apparent from the description hereinabove.

It will be seen that we have accomplishd the the objects of our invention. We provide our helmet assembly with a communication system which does not require a boom-carried microphone. Our communication system is so arranged as to avoid undesirable acoustical feedback.

It will be understood that certain features and subcombinations are of utility and may be employed without reference to other features and subcombinations. This is comtemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. In an earphone assembly for two-way voice communication including an earphone, means for fitting said earphone in relatively close adjacent relationship with an ear of a wearer, and a contact microphone, the improvement comprising means for urging said contact microphone against the head of the wearer in the region of said earphone and manually operable means carried by said assembly for alternatively disabling said contact microphone while enabling said earphone or disabling said earphone while enabling said contact microphone.

2. The improvement as in claim 1 in which said assembly comprises an earcup housing said earphone and having an acoustic seal for engaging the head of the wearer to form an acoustic enclosure containing said earphone, said urging means urging said contact microphone against the head of the wearer within said acoustic enclosure.

3. In an earphone assembly for two-way voice communication including first and second earphones, means for fitting said earphones in relatively close adjacent relationship with the respective ears of a wearer, and a contact microphone, the improvement comprising means for urging said contact microphone against the head of the wearer in the region of said first earphone and manually operable means carried by said assembly for alternatively disabling said contact microphone while enabling both of said earphones or disabling said first earphone while enabling said second earphone and said contact microphone.

4. The improvement as in claim 3 in which said assembly comprises an earcup housing said first earphone and having an acoustic seal for engaging the head of the wearer to form an acoustic enclosure containing said first earphone, said urging means urging said contact microphone against the head of the wearer within said acoustic enclosure.

5. An earcup assembly for two-way voice communication, including:
 (a) a first earcup having an acoustic seal for engaging the head of a wearer;
 (b) a first earphone housed by said first earcup;
 (c) a second earcup having an acoustic seal for engaging the head of a wearer;
 (d) a second earphone housed by said second earcup;
 (e) a contact microphone;
 (f) means for fitting said first and second earcups over the respective ears of a wearer with said seals in engagement with the wearer's head around his ears;
 (g) means mounting said microphone within the acoustic seal of said first earcup in contact with the head of the wearer;
 (h) means for selectively enabling said contact microphone; and (i) means responsive to said contact microphone enabling means for disabling said first earphone.

6. An assembly as in claim 5 in which said fitting means comprises a flexible helmet assembly adapted to fit relatively closely over the wearer's head.

7. An assembly as in claim 5 in which said enabling means comprises a first switch mounted in said first earcup and having an actuating member extending outside of said earcup, and in which said disabling means comprises a second switch mounted in said first earcup and means mechanically coupling said second switch to said first switch.

8. An assembly as in claim 5 in which said microphone mounting means includes means urging said microphone into contact with a point on the wearer's head spaced forward of and below the adjacent ear.

9. An assembly as in claim 5 in which said microphone mounting means comprises:

(a) a pivot arm having one end attached to said microphone and the other end pivotally attached to said earcup; and (b) means including a spring for biasing said pivot arm away from said earcup to urge said microphone into contact with the head of the wearer.

10. An assembly as in claim 5 in which said microphone mounting means comprises a pair of pivot arms disposed in parallel relation with one another and each having one end pivotally attached to said microphone.

11. An assembly as in claim 5 further including an ambient sound microphone fitted in one of said first and second earcups in acoustical communication with the surrounding environment, and means for selectively coupling said ambient sound microphone to said first and second earcups.

12. An assembly as in claim 11 in which said ambient sound microphone is fitted in said second earcup.

* * * * *